United States Patent
Eichholz et al.

[11] Patent Number: 5,363,717
[45] Date of Patent: Nov. 15, 1994

[54] BEARING MOUNT OF THE STEERING COLUMN TUBE OF A TELESCOPING STEERING COLUMN

[75] Inventors: Raimund Eichholz, Osnabrück; Klaus Schüller, Belm, both of Germany

[73] Assignee: Lemforder Metallwaren AG, Lemforde, Germany

[21] Appl. No.: 21,532

[22] Filed: Feb. 19, 1993

[30] Foreign Application Priority Data

Feb. 28, 1992 [DE] Germany .......................... 4206178

[51] Int. Cl.⁵ .............................................. B62D 1/18
[52] U.S. Cl. .......................................... 74/493; 74/531;
277/117; 384/296; 403/109; 403/371; 403/374
[58] Field of Search ................... 74/493, 531; 403/365,
403/366, 367, 368, 374, 371, 109; 285/302;
384/276, 295, 297; 277/106, 117, 119, 106, 188 R, 82

[56] References Cited

U.S. PATENT DOCUMENTS

| | | | |
|---|---|---|---|
| 3,049,368 | 8/1962 | Jansen | 403/365 |
| 3,627,336 | 12/1971 | Lawson | 277/188 R |
| 4,252,331 | 2/1981 | Siegel | 277/188 R X |
| 4,886,304 | 12/1989 | Kunsman | 285/302 X |
| 4,972,732 | 11/1990 | Venable et al. | 74/493 |
| 5,029,489 | 7/1991 | Burmeister et al. | 74/493 |
| 5,141,356 | 8/1992 | Chaize | 403/368 |

Primary Examiner—David W. Laub
Attorney, Agent, or Firm—McGlew and Tuttle

[57] ABSTRACT

This invention relates to the bearing mount of the steering column tube (1) of a telescoping steering column in which the steering column tube (1) is supported in a housing (2) on the body with axial mobility. To produce a bearing mount without play, the steering column tube (1) is mounted to move axially in the housing (2) in a bearing bushing (3) slotted in the longitudinal direction and made of a nonmetallic material, with this bearing bushing (3) being supported on an outer contour (5) conical in cross section with frictional adhesion against an inner cone (6) of the housing (2) under axial spring load.

7 Claims, 2 Drawing Sheets

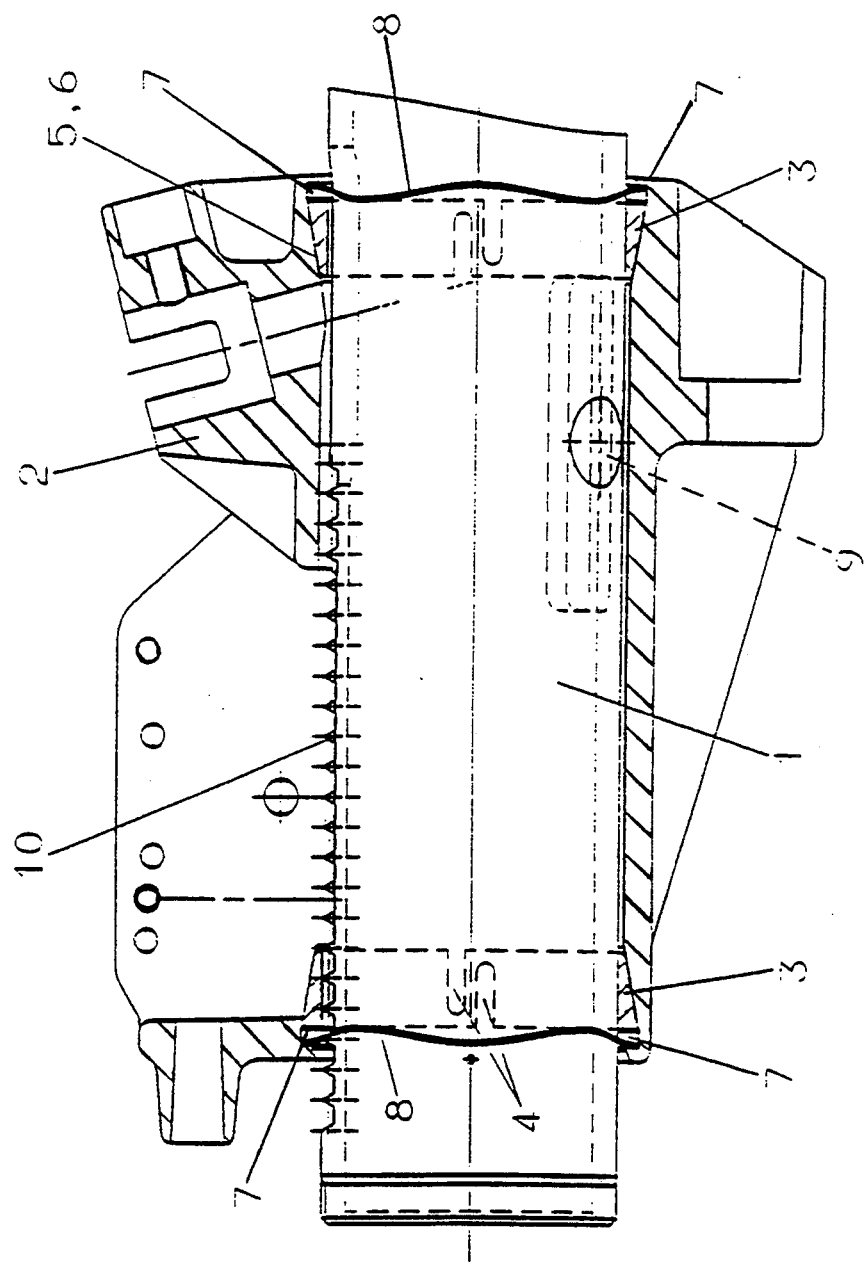

BEARING MOUNT OF THE STEERING COLUMN TUBE OF A TELESCOPING STEERING COLUMN

FIELD OF THE INVENTION

This invention relates to the bearing amount of the steering column tube of a telescoping steering column in which the steering column tube is supported in a housing vehicle body with the ability to slide in an axial direction.

BACKGROUND OF THE INVENTION

This bearing mount is disclosed by DE-OS 38 37 190. The upper part of a telescoping steering shaft to which the steering wheel is fastened is mounted to rotate in the steering column tube, so that the steering wheel, the upper part of the steering shaft, and the steering column tube or the upper part of a multiple-part steering column tube that likewise telescopes are adjustable together in the axial direction of the steering column. The set position of the steering wheel in the known system is fixed by a positive engagement of interlocking gear teeth on the circumference of the steering column tube and on locking elements movable in the housing that can be actuated. Instead of such engagement, clamping elements that act by friction are also known for use to secure the set positions, for example from U.S. Pat. No. 4,363,499 and from other publications.

SUMMARY AND OBJECTS OF THE INVENTION

The purpose of this invention is a design of such a bearing of the steering column tube in a housing secured to the body, which improves convenience, requires no alignment of the bearing mount, and especially during adjustment is independent of temperature differences and possible wear, and has no radial play.

According to the invention, a bearing mount of a steering column tube of a telescoping steering column is provided in which the steering column tube is supported in a housing on the vehicle body with the ability to slide in an axial direction. At least one bearing bushing is provided through which the steering column tube passes. The bearing bushing is slotted in a longitudinal direction and is formed of non-metallic material. The bearing bushing is positioned with axial mobility and is supported on an outer contour, which is conical in cross section, with frictional adhesion against an inner cone of the housing. A spring member is provided to place the bearing bushing under an axial spring load.

The bearing bushing is preferably provided with a greater surface roughness on its outer conical surface that on an internal sliding surface which is movable axially on the steering column tube.

Such a bearing mount is permanently easy-running and automatically resets itself after any radial play. The force that the driver must exert to change the longitudinal position of the steering wheel also does not change significantly under the influence of low temperatures. The self-resetting radial play compensation even after an extended lifetime also provides for precision mounting of the steering column tube in the housing independently of the effectiveness of the means for fixing the set steering wheel position.

In a preferred embodiment, the bearing bushing has greater surface roughness on its outer conical surface than on the inner slide surface movable axially on the steering column tube. Like the surface of the steering column tube, the sliding surface in this area can be pretreated especially for axial slippage and optionally can be coated with a material that has a low coefficient of friction so that the axial motion of the steering column tube in the bearing bushing to adjust the steering wheel position is free-moving. The bearing bushing is permanently loaded by spring pressure in the direction toward the theoretical conical tip, which is supported on the one hand against the face of the bearing bushing and on the other hand against an inner shoulder in the housing. The radial forces originating from the spring forces through the conical contour of the bearing bushing have the tendency to reduce the inside diameter of the bearing bushing resting uniformly on the outer circumference, and thereby compensate for play. To assist this action, the bearing bushing can have at least one slot not passing completely through from each face, the two of which are positioned with axes parallel to one another.

Another improvement of the desired action can be achieved by the steering column tube passing through several bearing bushings in succession in the housing so that the steering column tube is supported without play in the housing at several points. These bearing bushings also engage with an outer conical contour in an internal cone in the housing, so that the two conical surfaces are pressed to stick together with positive friction under axial spring load. The theoretical cone tips of the cone of each bearing bushing are advantageously pointed upward toward the steering wheel, so that the weight of the bearing bushing itself acts against the spring load, and only spring forces press the conical surfaces of the bearing bushings and of the inner cone on the housing together. This is intended to prevent jamming of the bearing bushings in their housing recesses. However, at least one of several bearing bushings can also point in the opposite direction with the theoretical conical tip of its cone, to counteract any possible radial play in this way.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectional view corresponding to FIG. 1 through a modified example of embodiment of the invention.

DETAILED DESCRIPTION OF THE PREFERRED EMBODIMENTS

Figure 2:
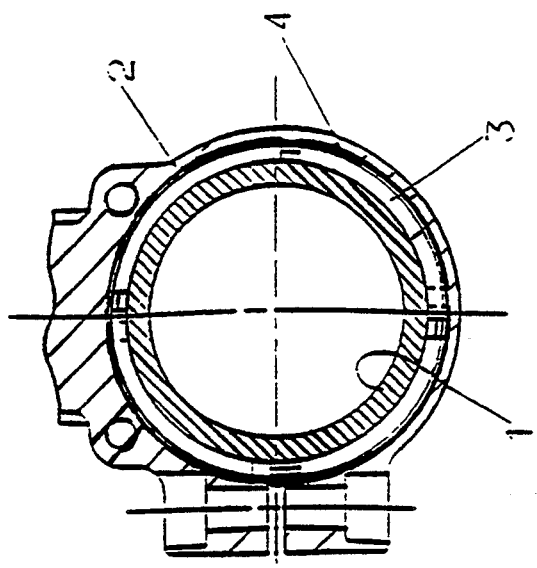
FIG. 2 is a sectional view taken along the line II—II in FIG. 1.

The steering column tube 1 is mounted in a housing 2 secured to the body, with ability to move in the axial direction. Inside the housing 2, the steering column tube 1 passes through two bearing bushings or bearing rings 3 at an axial distance from one another. The bearing bushings 3 are made of nonmetallic material, especially a plastic. The bearing bushings 3 are slotted in the axial direction or have slots 4 proceeding from both faces, which are arranged with axes parallel to one another. Each bearing ring 3 has a conical outer contour 5 that is supported against a complementary inner cone 6 in a recess 7 in the housing 2. The face of the bearing bushing 3 is permanently loaded on the side of the larger cone diameter by a corrugated annular spring 8. Spring 8 is supported on the other side against an inner annular shoulder in the recess 7, so that this corrugated annular spring 8 presses the conical surfaces on the outer circumference of the bearing bushing 3 and on the inside of the recess 7 axially against one another. By this structure radial forces are acting on the bearing bushing 3, by which the bearing play between the steering column tube 1, the bearing bushing 3, and the housing 2 are compensated. The surface roughness of the bearing bushing 3 on the outside is greater than the surface roughness for the sliding motion on the inside of the bearing bushing 3, so that the bearing bushing 3 is held in place by the greater surface roughness on the housing 2, and in any case slides on the surface of the steering column tube 1.

Figure 1:
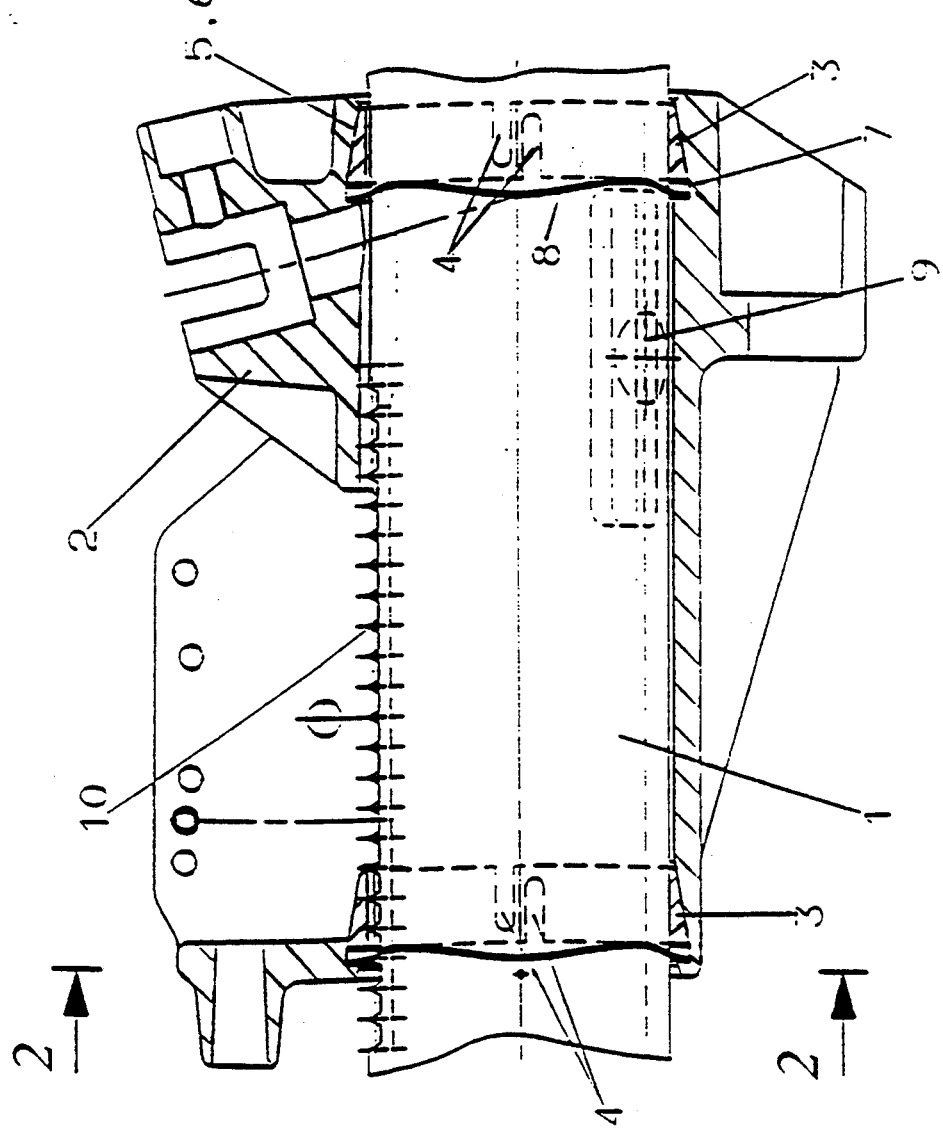
FIG. 1 is a sectional view taken through the bearing in an axial plane.

In the example of FIG. 1, there are two bearing bushings 3 positioned in the same direction at an axial distance from one another so that the theoretical cone tips of the outer cone of the two bearing bushings 3 point upward toward the steering wheel, and the weight of the bearing bushings 3 themselves counteracts the spring forces of the annular spring 8. By contrast, the bearing bushings 3 in the example of embodiment in FIG. 3 point in opposite directions to one another with the theoretical cone tips of the outer conical surfaces, with the same bearing design otherwise.

Locking of the steering column tube 1 against rotation relative to the housing 2, which permits axial motions of the steering column tube relative to the housing, may be achieved by engaging the surface portion which is indicated by the dashed lines 9 in FIGS. 1 and 3. To fix the set position of the steering wheel and thus of the steering column tube 1 relative to the housing 2, a ratchet element with complementary teeth engages in teeth 10 provided on the circumference of the steering column tube 1, not illustrated for better clarity of the drawing. This ratchet element mounted to move in the housing can be operated by an external handle, which is known in itself.

While specific embodiments of the invention have been shown and described in detail to illustrate the application of the principles of the invention, it will be understood that the invention may be embodied otherwise without departing from such principles.

What is claimed is:

1. A bearing mount of a steering column tube of a telescoping steering column, comprising:
   a steering column tube supported in a housing, said steering column tube being slidable in an axial direction;
   at least one bearing bushing through which said steering column tube passes, said bearing bushing being formed of non-metallic material formed with a slot extending in a longitudinal direction, said bearing bushing being axially mobile and being supported on an outer contour, conical in cross section with frictional adhesion against an inner cone formed in said housing; and
   spring means for applying an axial spring load on said bearing bushing said spring means is supported positioned against a face of said bearing bushing having a larger cone diameter and against said housing.

2. A bearing mount according to claim 1, wherein:
   said slot of said bearing bushing includes plural slots not passing completely through, on each of two faces, said slots being positioned axes parallel to one another.

3. A bearing mount according to claim 1, wherein:
   said steering column tube passes through said bearing bushings in succession in the housing.

4. A bearing mount according to claim 1, wherein:
   a tip at a small end of said bushing points toward a steering wheel connection location.

5. A bearing mount according to claim 1, wherein:
   a plurality of bearing bushings are positioned, each with a theoretical conical tip pointed in an opposite direction.

6. A bearing mount of a steering column tube of a telescoping steering column, comprising:
   a steering column tube supported in a housing on a vehicle body, said steering column tube being slidable in an axial direction;
   at least one bearing bushing through which said steering column tube passes, said bearing bushing being axially mobile and being supported on an outer contour, conical in cross section with frictional adhesion against an inner cone formed in said housing; and
   spring means for applying an axial spring load on said bearing bushing said spring means being supported positioned against a face of said bearing bushing having a larger cone diameter and against said housing.

7. A bearing mount of a steering column tube of a telescoping steering column, comprising:
   a steering column tube supported in a housing, said steering column tube being slidable in an axial direction;
   at least one bearing bushing through which said steering column tube passes, said bearing bushing being formed of non-metallic material formed with a slot extending in a longitudinal direction, said bearing bushing being axially mobile and being supported on an outer contour, conical in cross section with frictional adhesion against an inner cone formed in said housing said bearing bushing has a surface roughness on an outer conical surface which is greater than a surface roughness of an internal sliding surface movable axially on said steering column tube; and
   spring means for applying an axial spring load on said bearing bushing said spring means is supported positioned against a face of said bearing bushing having a larger cone diameter and against said housing.

* * * * *